US006700978B2

(12) United States Patent
Bershad et al.

(10) Patent No.: US 6,700,978 B2
(45) Date of Patent: Mar. 2, 2004

(54) METHOD AND APPARATUS FOR FAST CONVERGING AFFINE PROJECTION BASED ECHO CANCELLER

(75) Inventors: Neil Bershad, Newport Beach, CA (US); Anurag Bist, Irvine, CA (US); Stan Hsieh, Diamond Bar, CA (US)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 09/947,804

(22) Filed: Sep. 6, 2001

(65) Prior Publication Data

US 2002/0071547 A1 Jun. 13, 2002

Related U.S. Application Data

(60) Provisional application No. 60/231,420, filed on Sep. 8, 2000.

(51) Int. Cl.[7] ................................................. H04M 1/00
(52) U.S. Cl. ............................. 379/406.08; 379/406.01
(58) Field of Search ..................................... 379/406.08

(56) References Cited

U.S. PATENT DOCUMENTS 5,272,695 A     12/1993   Makino et al.
5,737,410 A  *  4/1998    Vahatalo et al. ....... 379/406.08
6,137,881 A  *  10/2000   Oh et al. ............... 379/406.08
6,201,866 B1    3/2001    Ariyama et al.
6,246,760 B1    6/2001    Makino et al.

OTHER PUBLICATIONS

Tomas Gansler, et. al., A Robust Proportionate Affine Projection Algorithm For Network Echo Canellation, IEEE, 2000, 4 pages.

Yang–Won Jung, et. al., A New Adaptive Algorithm For Stereophonic Acoustic Echo Canceller, IEEE, 2000, 4 pages.

* cited by examiner

Primary Examiner—Xu Mei
Assistant Examiner—Jefferey Harold
(74) Attorney, Agent, or Firm—Blakely, Sokoloff, Taylor & Zafman LLP

(57) ABSTRACT

An adaptive filter estimates a channel weight vector of an echo channel using an affine projection (AP) update. The echo channel receives a send input sequence and a receive input sequence. The channel weight vector has first and second lengths when the adaptive filter operates in a first adaptation mode and a second adaptation mode, respectively. A delay estimator determines a delay in the echo channel using the adaptive filter in the first adaptation mode.

36 Claims, 17 Drawing Sheets

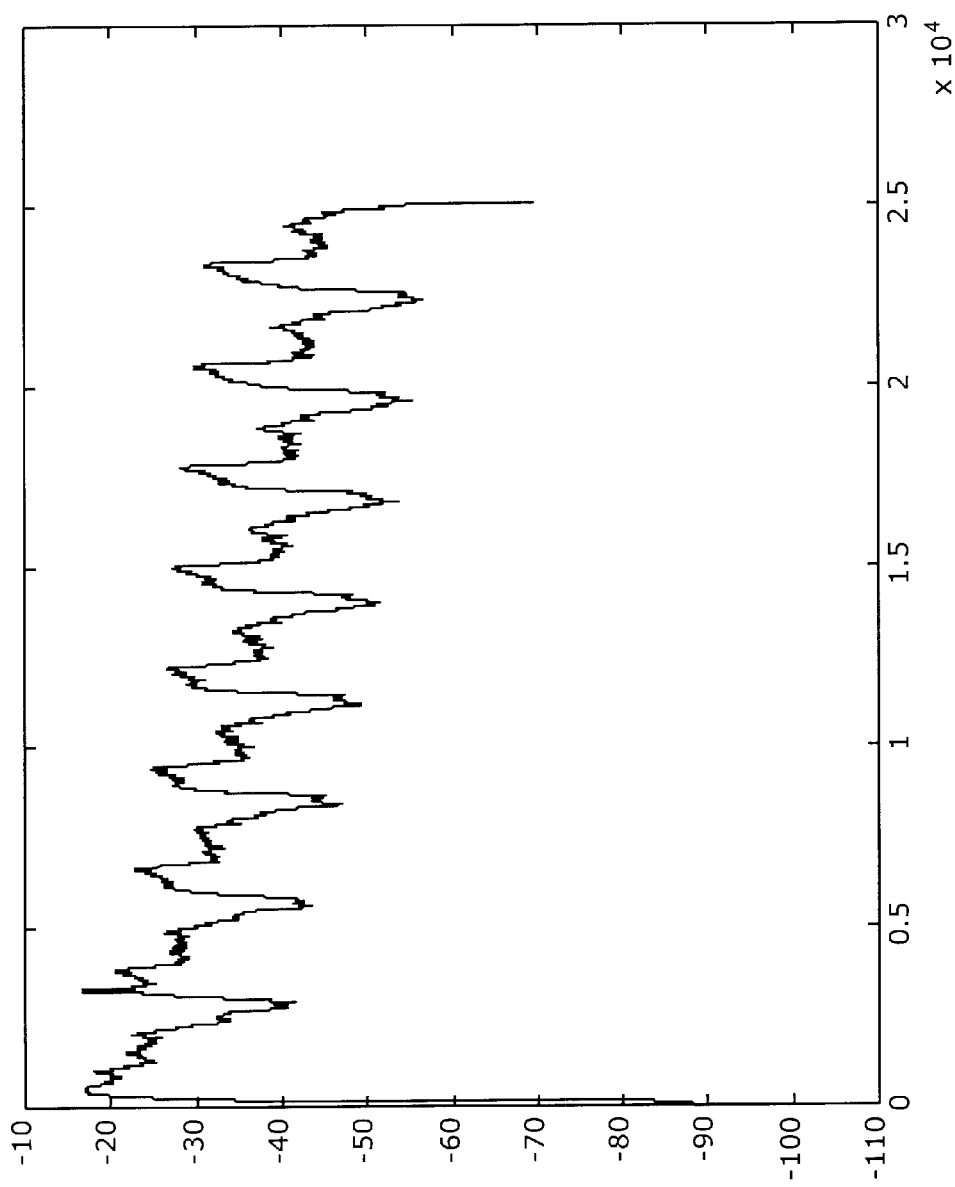

METHOD AND APPARATUS FOR FAST CONVERGING AFFINE PROJECTION BASED ECHO CANCELLER

RELATED APPLICATION

This application claims the benefit of U.S. Provisional Patent Application No. 60/231,420 filed on Sep. 8, 2000 (Attorney Docket No. 004419.P015Z).

This application is related to U.S. patent application Ser. No. 09/947,887 filed on Sep. 6, 2001, entitled Fast Converging Affine Projection Based Echo Canceller For Sparse Multi-Path Channels," and assigned to the same assignee of the present application.

BACKGROUND

1. Field of the Invention

This invention relates to signal processing. In particular, the invention relates to echo cancellation.

2. Description of Related Art

Echo is generally undesirable in telephony. Echo is caused a number of sources. These include multiple reflections of the signal from the loudspeaker back to the microphone, direct acoustic coupling between the loudspeaker and the telephone, and ambient noise. Echo cancellation is a technique to reduce the undesirable effects of the echo. The echo canceller estimates the impulse response of the echo path and generates an estimate of the echo. The estimated echo is then subtracted from the near-end signal. Typically, an adaptive filter is used to estimate the echo because the echo path is usually unknown and randomly time-varying.

An existing technique for echo cancellation is the normalized least mean squares (NLMS) method. This method attempts to minimize the expected value of the squared error. However, the NLMS method has a number of disadvantages. One significant disadvantage is its slow convergence rate for colored inputs.

Therefore, there is a need to have an efficient technique to perform echo cancellation having a convergence rate faster than the NLMS method.

BRIEF DESCRIPTION OF THE DRAWINGS

The features and advantages of the invention will become apparent from the following detailed description of the invention in which:

FIG. 11B is a diagram illustrating attenuation in dB for the echo canceller using NLMS with M=1024 according to one embodiment of the invention.

DESCRIPTION

Figure 1:
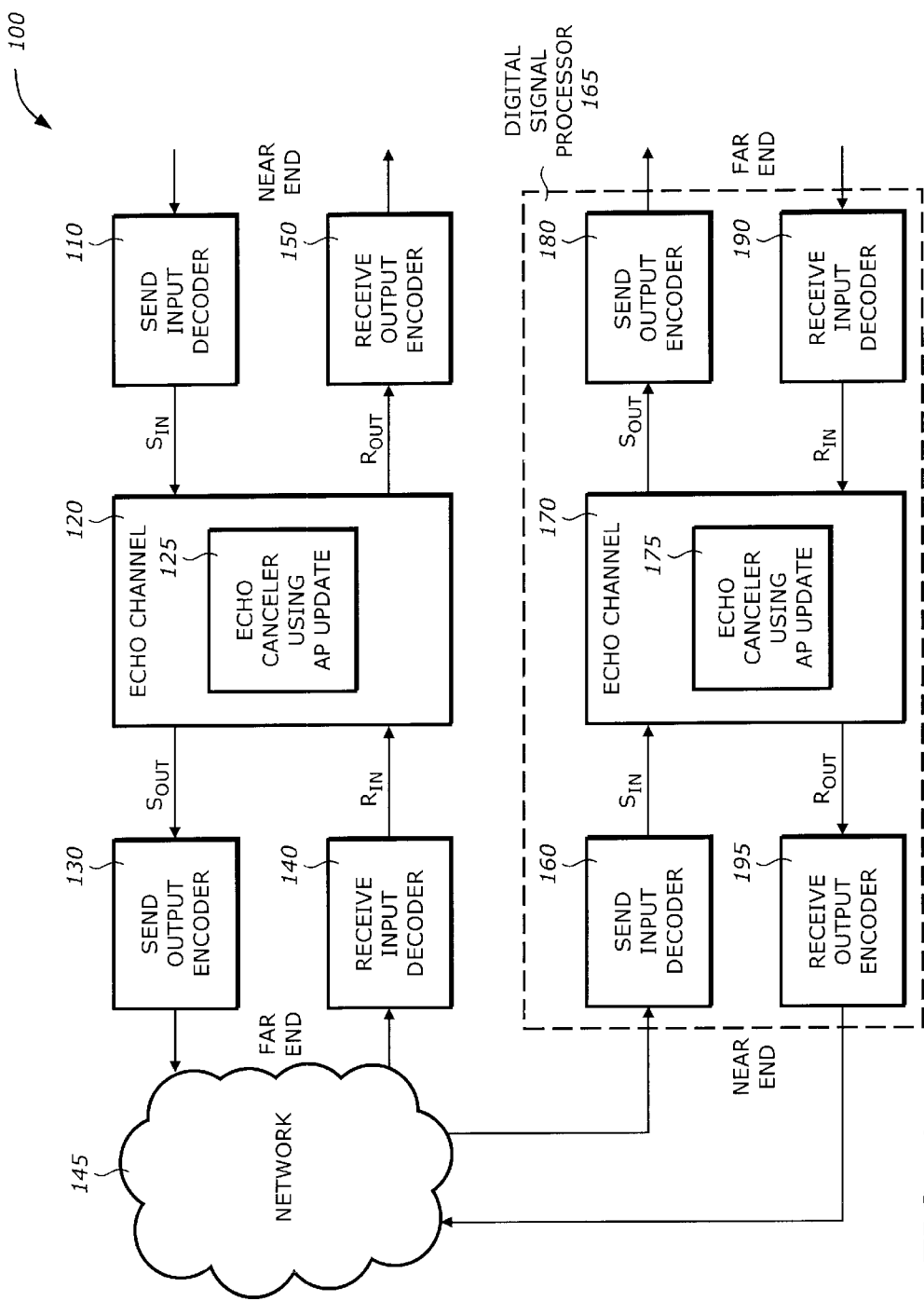
FIG. 1 is a diagram illustrating a system in which one embodiment of the invention can be practiced.

In the following description, for purposes of explanation, numerous details are set forth in order to provide a thorough understanding of the invention. However, some of these specific details are not required in order to practice the present invention. In other instances, well-known electrical structures and circuits are shown in block diagram form in order not to obscure the invention.

The invention may be implemented by hardware, software, firmware, microcode, or any combination thereof. When implemented in software, firmware, or microcode, the elements of the present invention are the program code or code segments to perform the necessary tasks. A "code segment" may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "machine readable medium" may include any medium that can store or transfer information. Examples of the processor readable medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The invention is a method and apparatus to improve echo cancellation performance. An adaptive filter uses an affine projection (AP) update rule to update the estimates in first and second adaptation modes. In the first adaptation mode, the adaptive filter determines the bulk delay using a long filter length to estimate the channel weight vector. After the bulk delay is estimated, the adaptive filter switches to the second adaptation mode to estimate the channel weight vector with a short filter length based on the estimated bulk delay. The technique shows a convergence rate faster than the NLMS method.

FIG. 1 is a diagram illustrating a system 100 in which one embodiment of the invention can be practiced. The system 100 includes a send input decoder 110, an echo channel 120, a send output decoder 130, a receive input decoder 140, a receive output encoder 150, a network 145, a send input decoder 160, an echo channel 170, a send output decoder 180, a receive input decoder 190, and a receive output encoder 195.

The send input decoder 110 receives the encoded speech from a first near end and decodes the encoded speech into linear speech data Sin. In one embodiment, the send input decoder 110 is a µ-Law/A-Law decoder. The echo channel 120 includes an echo canceller using affine projection (AP) 125. The AP-based echo canceller 125 removes an echo estimated signal from the linear data samples Sin to generate linear data samples Sout. The send output encoder 130 provides speech compression before packetizing. In one embodiment, the send output encoder 130 is a G.7xx encoder which compresses the speech data Sout from the echo channel 120 using any one of the compression standards for low-bit rate voice (LBRV) including the International Telecommunication Union (ITU)-T internationally standardized G.7xx series. The compressed speech data are sent to the far end via a network. The receive input decoder 140 de-compresses the speech data received from the first far end over the network 145. The de-compression technique is compatible with the compression used in the send output encoder 130. The echo channel 120 receives the Rin from the receive input decoder 140 and sends out the Rout linear data samples. The receive output encoder 150 encodes the linear data samples Rout into µ-Law and A-law encoded speech to be sent out to the first near end.

The network 145 is any network having capability to transmit packetized data from and to the send output decoder 130, the send input decoder 160, the receive input decoder 140, and the receive output decoder 195. The network 145 may be the Internet, an intranet, an extranet, a local area network (LAN), or a wide area network (WAN). The send input decoder 160 receives the encoded speech from the network 145 and decodes the encoded speech into linear speech data Sin. In one embodiment, the send input decoder 160 is a µ-Law/A-Law decoder. The echo channel 170 includes an echo canceller using affine projection (AP) 175. The AP-based echo canceller 175 removes an echo estimated signal from the linear data samples Sin to generate linear data samples Sout. The send output encoder 180 provides speech compression before packetizing. In one embodiment, the send output encoder 180 is a G.7xx encoder which compresses the speech data Sout from the echo channel 170 using any one of the compression standards for low-bit rate voice (LBRV) including the International Telecommunication Union (ITU)-T internationally standardized G.7xx series. The compressed speech data are sent to a receiving device at the second far end. The receive input decoder 190 de-compresses the speech data received from the second far end. The de-compression technique is compatible with the compression used in the send output encoder 180. The echo channel 170 receives the Rin from the receive input decoder 190 and sends out the Rout linear data samples. The receive output encoder 190 encodes the linear data samples Rout into µ-Law and A-law encoded speech to be sent out to the second near end to the network 145. In one embodiment, the send input decoder 160, the echo channel 170, the send output decoder 180, the receive input decoder 190, and the receive output encoder 195 are integrated into a digital signal processor 165.

Figure 2:
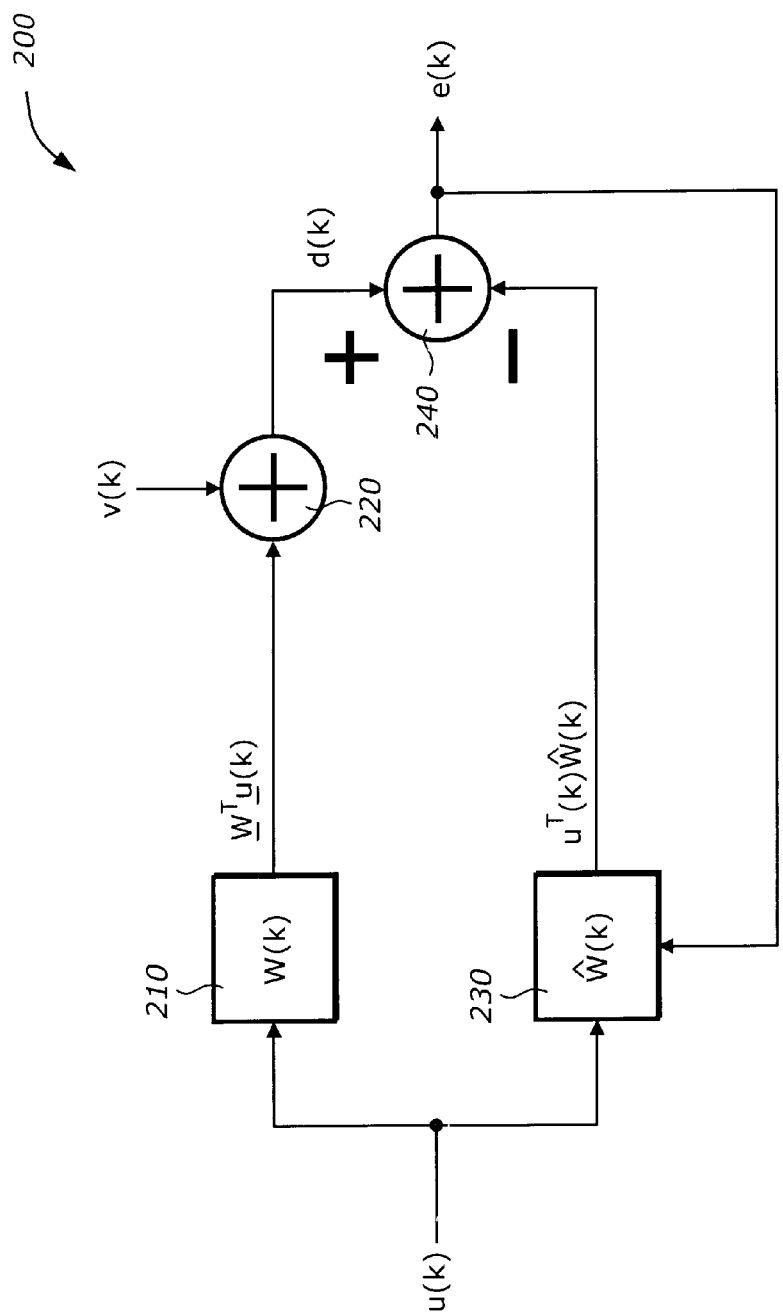
FIG. 2 is a diagram illustrating a system model for the AP-based echo canceller shown in FIG. 1 according to one embodiment of the invention.

FIG. 2 is a diagram illustrating a system model for the AP-based echo canceller 125 shown in FIG. 1 according to one embodiment of the invention. The system model 200 includes a plant 210, an adder 220, an adaptive filter 230, and a subtractor 240.

The system model 200 models an echo cancellation process. The echo cancellation process can be modeled as a system identification problem where an unknown linear system is to be identified. The input to the system is an input sequence u(k). The plant 210 characterizes the system behavior. The plant 210 can be modeled as a finite impulse response (FIR) filter having weight vector W=[$w_1$, $w_2$, ... $w_N$]. The plant output is given by:

$$y(k)=W^T u(k) \qquad (1)$$

where $W^T$ is the transpose of the weight vector W. The weight vector W is unknown.

The adder 220 adds a random noise sequence v(k) to the plant output y(k) to produce the desired output d(k). The adaptive filter 230 is modeled as a FIR filter having the weight vector $\hat{W}$=[$w_1$, $w_2$, ..., $w_N$]. The subtractor 240 subtracts the desired output d(k) from the output of the adaptive filter to produce an error e(k). The error e(k) is used to adjust or update the weight vector $\hat{W}$ such that the error e(k) is minimized under some objective function (e.g., least mean square). The weight vector $\hat{W}$ is updated such that it approaches the weight vector W. The weight vector $\hat{W}$, therefore, represents an estimate of the weight vector W.

Figure 3:
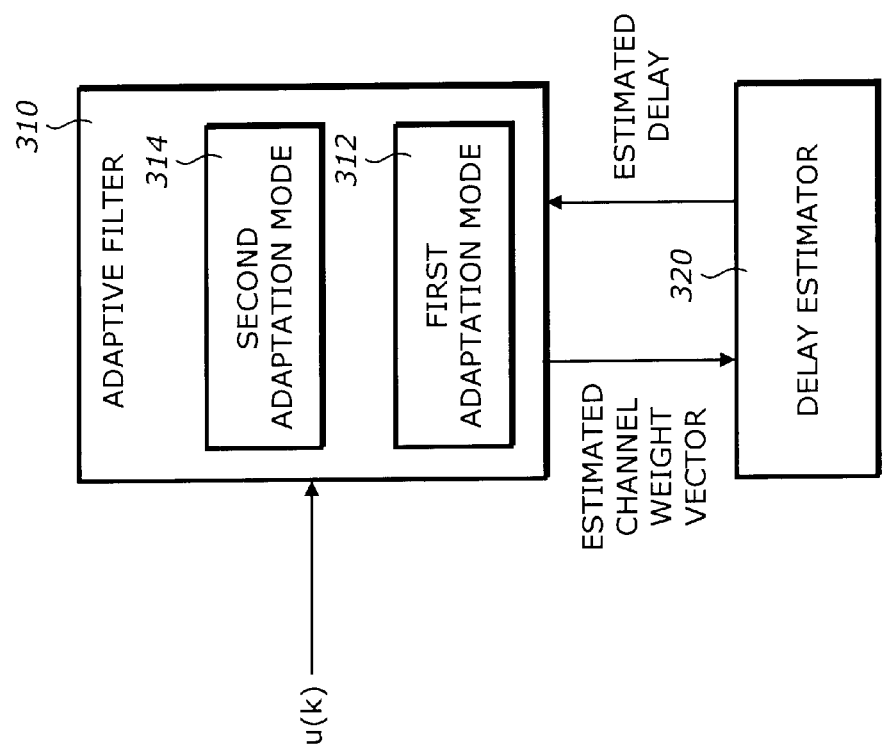
FIG. 3 is a diagram illustrating an AP-based echo canceller shown in FIG. 1 according to one embodiment of the invention.

FIG. 3 is a diagram illustrating the AP-based echo canceller 125 shown in FIG. 1 according to one embodiment of the invention. The echo canceller 125 includes an adaptive filter 310 and a delay estimator 320.

The adaptive filter 310 estimates a channel weight vector W of the echo channel 120 (FIG. 1) using an affine projection (AP) update. As described in FIG. 1, the echo channel 120 receives a send input sequence Sin and a receive input sequence Rin. The adaptive filter 310 operates in two modes:

a first adaptation mode 312 and a second adaptation mode 314. The first adaptation mode 312 is the mode where the adaptive filter 310 is used to calculate the bulk delay of the echo channel 120. The second adaptation mode 314 is the mode where the adaptive filter 310 adjusts or updates the channel weight vector W. The channel weight vector W has a first length M1 and a second length M2 when the adaptive filter 310 operates in the first adaptation mode 312 and the second adaptation mode 314, respectively. The first length M1 is longer than the second length M2. For example, M1=1024 and M2=256. Alternatively, the adaptive filter 310 may be replaced by two adaptive filers having filter lengths M1 and M2.

The delay estimator 320 determines the bulk delay in the echo channel 120 using the estimated channel weight vector W provided by the adaptive filter 310 operating in the first adaptation mode 312. The delay estimator 320 provides the estimated delay to the adaptive filter 310. The adaptive filter 310 uses this estimated delay to position the filter accordingly in the second adaptation mode 314.

The adaptive filter 310 uses an AP update rule to estimate the channel weight vector. The AP method is used to accelerate the convergence of the normalized least mean square (NLMS) technique, especially for colored inputs. The AP updates the weights on the basis of multiple past input vectors, while the NLMS updates the weights on the basis of the most recent input vector. The AP update rule is described in the following.

The input sequence u(k) can be modeled as an auto-regressive process of order P, denoted as AR(P):

$$u(k) = \sum_{i=1}^{P} a_i * u(k-i) + z(k) \qquad (2)$$

where z(k) is white sequence with unit variance.

Assuming P is known a priori, samples of u(k) can be written as an (M×1) column vector u(k), or:

$$u^T(k) = [u(k), u(k-1), \ldots, u(k-M+1)] \qquad (3)$$

The AR(P) process can then be written as:

$$\begin{aligned} u(k) &= \sum_{i=1\ to\ P} a_i * u(k-i) + z(k) \\ &= U(k) * a + z(k) \end{aligned} \qquad (4)$$

where U(k) is a collection of P of past vectors:

$$U(k) = [u(k-1), u(k-2), \ldots, u(k-P)] \qquad (5)$$

and z(k) is an (M×1) column vector of samples of a white random sequence:

$$z^T(k) = [z(k), z(k-1), \ldots, z(k-M+1)] \qquad (6)$$

The least squares estimate of the parameters of a is given by $$\hat{a}(k) = [U^T(k) * U(k)]^{-1} * U^T(k) * u(k) \qquad (7)$$

where $U^T(k)*U(k)$ is assumed of rank P and * denotes multiplication.

The AP recursive update rule for $\mu$=1 is defined by the following set of operations:

$$\begin{aligned} \phi(k) &= u(k) - U(k) * \hat{a}(k) \\ &= \{I - U(k) * [U^T(k) * U(k)]^{-1} * U^T(k)\} * u(k) \end{aligned} \qquad (8)$$

$$e(k) = d(k) - u^T(k) * \hat{W}(k) \qquad (9)$$

$$\hat{W}(k+1) = \hat{W}(k) + [\Phi(k)/(\Phi^T(k)* \Phi(k))] * e(k) \qquad (10)$$

where w(k) is the channel weight vector estimated by the adaptive filter 310.

It has been shown that if u(k) is an AR process of order P, â(k) is a least squares estimate of its AR coefficients and $\phi(k) \approx z(k)$. In other words, $\phi(k)$ is a vector whose elements are estimates of a white random sequence.

Figure 4:
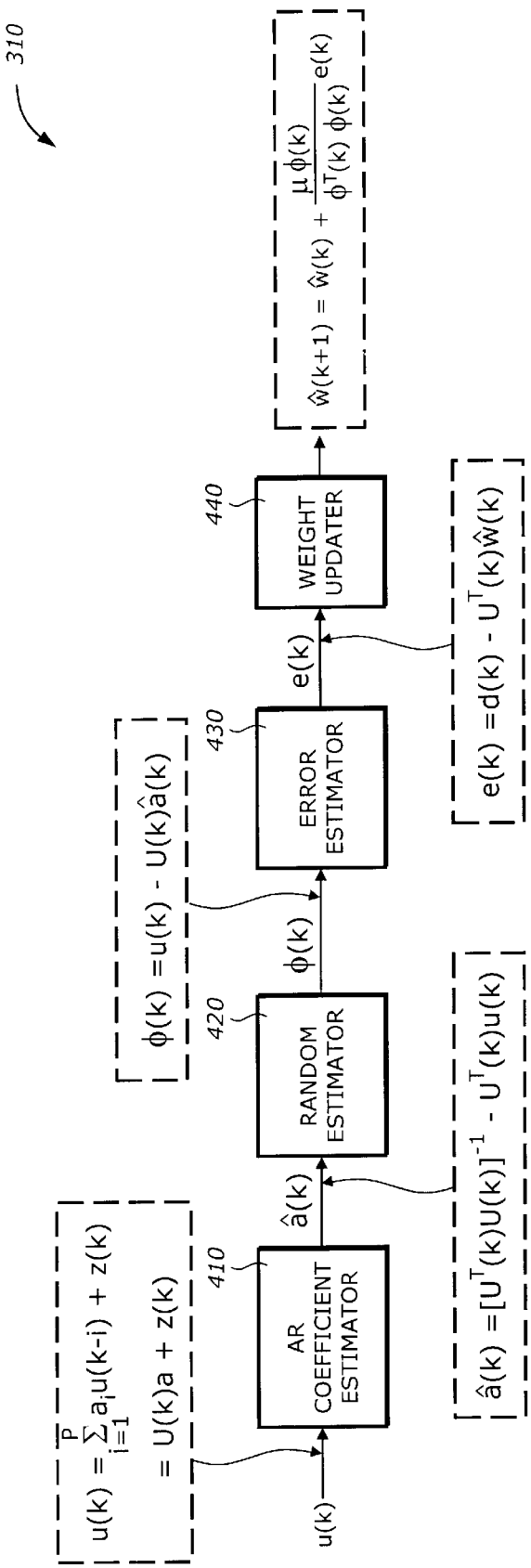
FIG. 4 is a diagram illustrating an adaptive filter for the AP-based echo canceller shown in FIG. 3 according to one embodiment of the invention.

FIG. 4 is a diagram illustrating the adaptive filter 310 for the AP-based echo canceller shown in FIG. 3 according to one embodiment of the invention. The AP-based adaptive filter 310 includes an auto-regressive (AR) coefficient estimator 410, a random estimator 420, an error estimator 430, and a weight updater 440.

The AR coefficient estimator 410 estimates the AR coefficient vector a(k) at a first update rate using the past receive input sequence and the receive sequence. The AR coefficient estimator 410 generates the AR coefficient vector â(k) using equation (7).

The random estimator 420 estimates the random sequence $\phi(k)$ at a second update rate using the estimated AR coefficient vector. The random estimator 420 determines the random sequence $\phi(k)$ using equation (8).

The error estimator 430 estimates an error at the second update rate using the send sequence, the receive sequence, and the estimated channel weight vector. The error estimator 430 computes the error e(k) using equation (9).

The weight updater 440 updates the channel weight vector Ŵ at the second update rate using the estimated error and the estimated random sequence. The weight updater 440 updates the channel weight Ŵ using equation (10).

The first and second update rates may be the same or different. In one embodiment, the first update rate is slower than the second update rate. The second update rate is the rate at every iteration of the update loop. The first update rate is the rate at every K iterations where K is a positive integer. In one embodiment, K is equal to 100. In other words, the AR coefficient estimator 410 generates a new result at every K iterations while the random estimator 420, the error estimator 430 and the weight updater 440 generates new results at every iteration.

Figure 5:
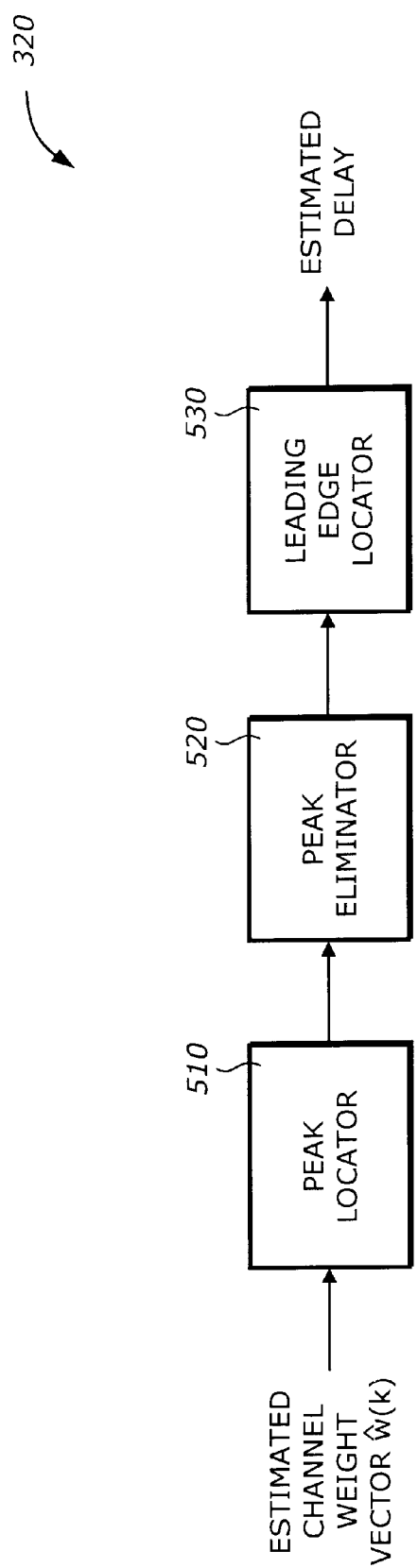
FIG. 5 is a diagram illustrating a delay estimator for the AP-based echo canceller shown in FIG. 2 according to one embodiment of the invention.

FIG. 5 is a diagram illustrating the delay estimator 320 for the AP-based echo canceller shown in FIG. 2 according to one embodiment of the invention. The delay estimator 320 includes a peak locator 510, a peak eliminator 520, and a leading edge locator 530.

The delay estimator 320 estimates the bulk delay in the echo channel 120 (FIG. 1) from the estimated channel weight vector Ŵ(k). The estimated delay provided by the delay estimator 320 is used by the adaptive filter 310 (FIG. 3) for the adaptation. The delay estimator 320 essentially locates a number of peaks in the impulse response as provided by the components of the estimated weight vector Ŵ(k).

The peak locator 510 determines the peaks as the maximum values of the weights within a search region. Typically L peaks are located where L is a positive integer from 1 to 5. In one embodiment, L is equal to 5. The L peaks are located within a predetermined distance from one another.

First, the highest peak is determined as the highest absolute value of the weights in the channel weight vector $\hat{W}(k)$. Then, the second highest peak is located outside the region covering the highest peak. This region includes L1 samples on either side of the highest peak. In one embodiment, L1=25. Then, the third highest peak is located outside the region covering the second highest peak. This region includes L2 samples on either side of the second highest peak. In one embodiment, L2=25. The process continues until all L peaks have been located.

The peak eliminator 520 eliminates a false peak in the L peaks located by the peak locator 510. The false peak is identified when its value is less than a threshold value. In one embodiment, this threshold value is equal to β*highest peak value where β is a number between 0.4 to 0.8. In one embodiment, β=0.6.

The leading edge locator 530 locates a leading edge of the impulse response. The leading edge is the peak at the smallest delay of the L peaks. After the leading edge is located, the delay is calculated as the sum of the leading edge position and a predetermined distance. In one embodiment, this predetermined distance is approximately equal to 25. The objective of the leading edge locator 530 is to place the leading edge of the echo response near the first tap of the adaptive filter operating in the second adaptation mode.

Figure 6:
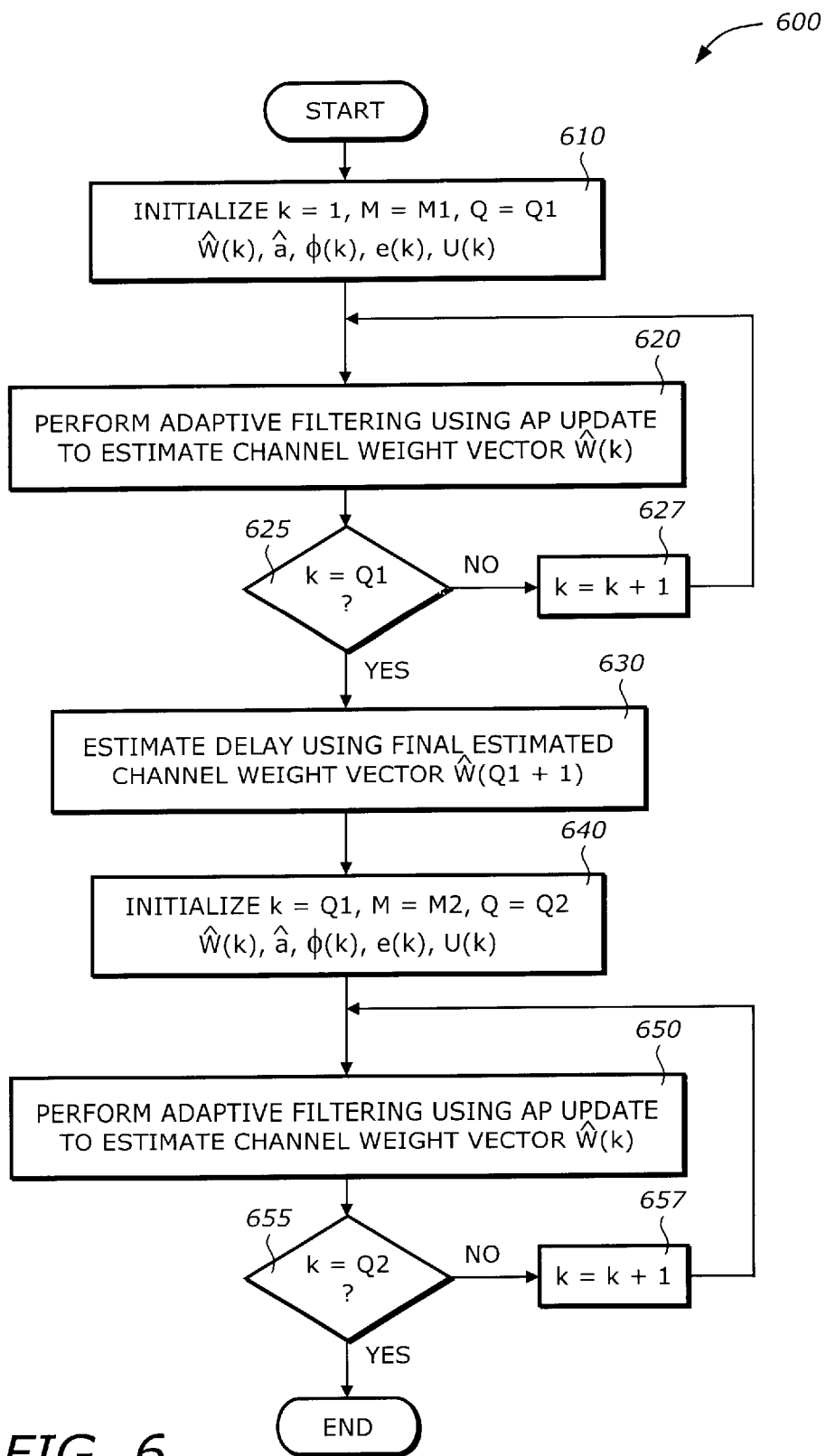
FIG. 6 is a flowchart illustrating a process for echo cancellation according to one embodiment of the invention.

FIG. 6 is a flowchart illustrating a process 600 for echo cancellation according to one embodiment of the invention.

Upon START, the process 600 initializes the iteration index k=1, the filter length M=M1, the number of iterations Q=Q1, the channel weight vector $\hat{W}(k)$, the AR coefficient vector â, the random sequence φ(k), the error e(k), and the past receive input sequence U(k) (Block 610). In one embodiment, M1 is equal to 256, 512, or 1024. Next, the process 600 performs adaptive filtering using the AP update to estimate the channel weight vector $\hat{W}(k)$ (Block 620). Then, the process 600 determines if the iteration index k is equal to Q1 (Block 625). If so, the process 600 increments the iteration index k (Block 627) and goes back to Block 620. Otherwise, the process 600 estimates the delay using the estimated channel weight vector $\hat{W}(k)$ (Block 630).

Next, the process 600 initializes the iteration index k=Q1, the filter length M=M2, the number of iterations Q=Q2, the channel weight vector $\hat{W}(k)$, the AR coefficient vector â, the random sequence φ(k), the error e(k), and the past receive input sequence U(k) (Block 640). M2 is typically less than M1. In one embodiment where M1=1024, M2=256. Then, the process 600 performs the adaptive filtering using the AP update to estimate the channel weight vector $\hat{W}(k)$ (Block 650). The calculations and updating in Block 650 are essentially the same as those in Block 620. In this way, the same filter implementation can be used in both stages. Alternatively, two identical adaptive filters may be implemented. Then, the process 600 determines if the iteration index k is equal to Q2 (Block 655). If not, the process 600 increments the iteration index k (Block 657) and goes back to Block 650. Otherwise, the process 600 is terminated.

Figure 7:
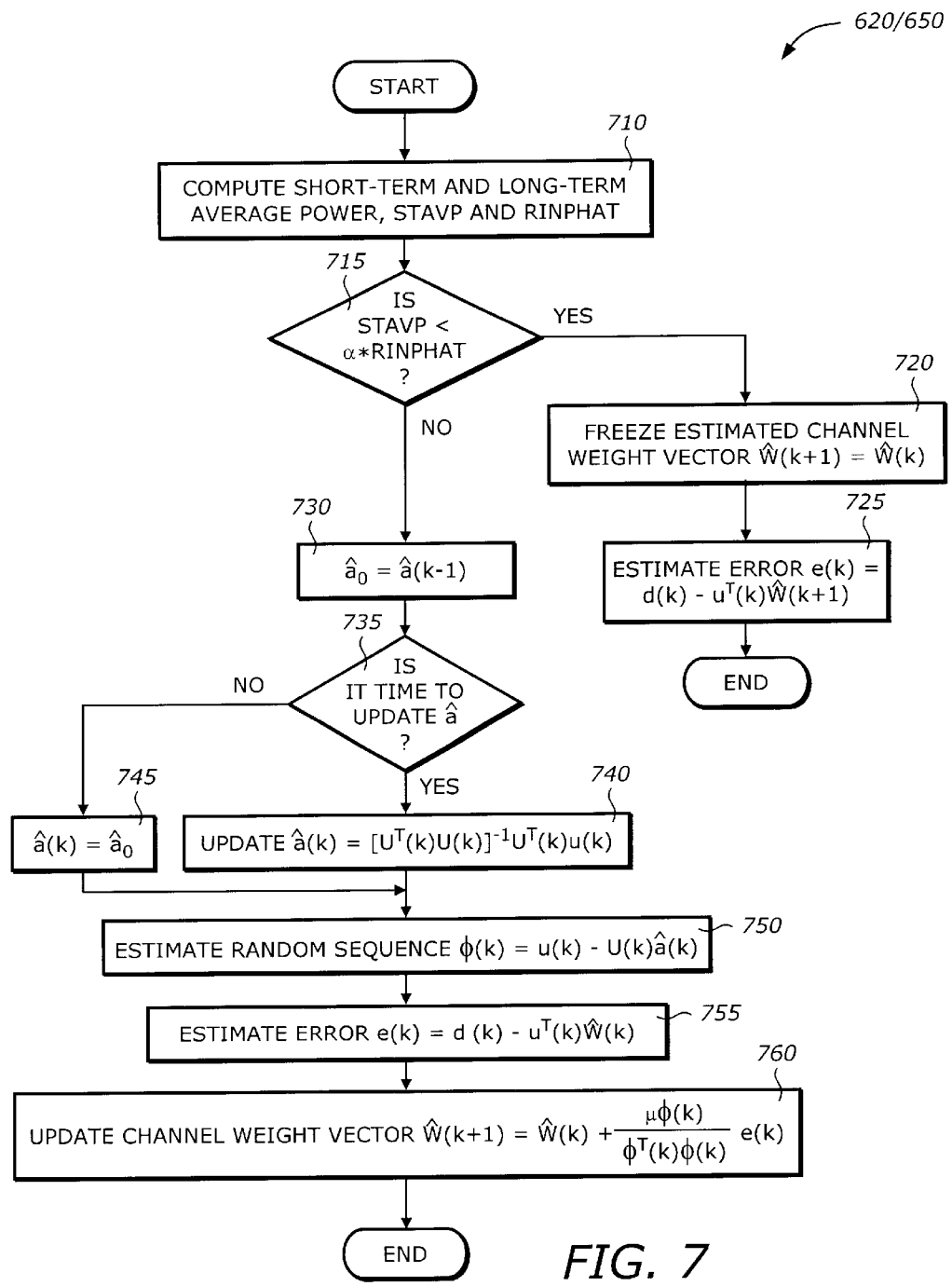
FIG. 7 is a flowchart illustrating a process for adaptive filtering using AP update shown in FIG. 6 according to one embodiment of the invention.

FIG. 7 is a flowchart illustrating a process 620 for adaptive filtering using AP update shown in FIG. 6 according to one embodiment of the invention. The process 620 is essentially the same as the process 650. For brevity, only the reference number 620 is used.

Upon START, the process 620 computes the short term average power, stavp, and the long-term average power, Rinphat (Block 710). Then, the process 620 determines if stavp is less than Rinphat by a predetermined amount (Block 715). In one embodiment, this amount is 20 dB. If so, the process 620 freezes the estimated channel weight vector (Block 720) and estimates the error d(k) and is then terminated. Otherwise, the process 620 saves the estimated receive vector (k−1) (Block 730).

Next, the process 620 determines if it is time to update the AR coefficient vector a (Block 735). In one embodiment, this first update rate corresponds to every R iterations where R=100. If it is not time to update, the estimated AR coefficient vector is kept the same as the previous value saved in Block 730. Otherwise, the AR coefficient vector â is updated according to equation (7). Next, the process 620 estimates the random sequence φ(k) using equation (8) (Block 750). Then, the process 620 estimates the error e(k) using equation (9). Next, the process 620 updates the channel weight vector $\hat{W}(k)$ using equation (10). Then, the process 620 determines if the maximum number of iterations has been reached (Block 770). If not, the process 620 increments the iteration index k (Block 780). Otherwise, the process 620 is terminated.

Figure 8:
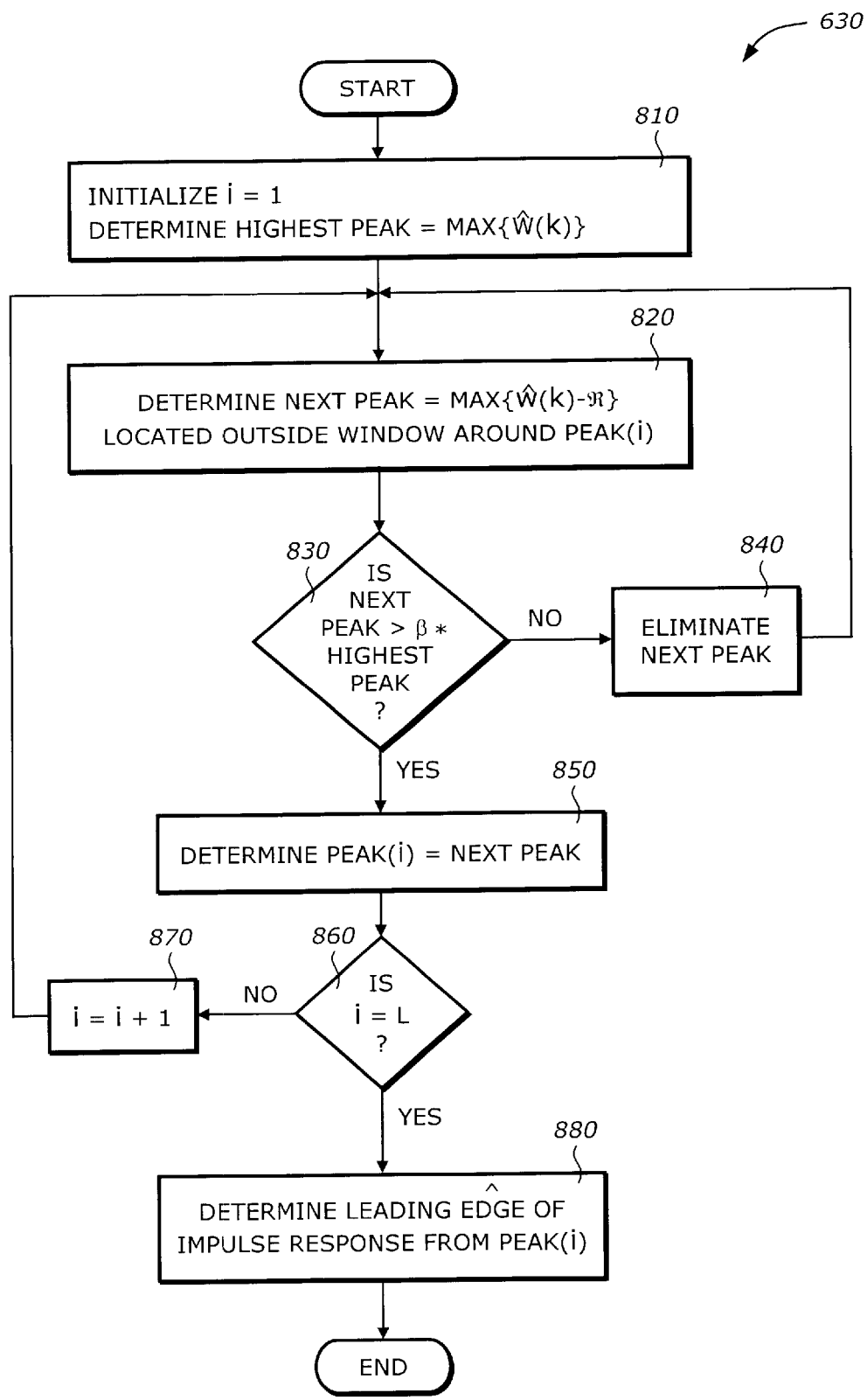
FIG. 8 is a flowchart illustrating a process for delay estimation shown in FIG. 6 according to one embodiment of the invention.

FIG. 8 is a flowchart illustrating a process 630 for delay estimation shown in FIG. 6 according to one embodiment of the invention.

Upon START, the process 630 initializes the peak index i=1 and determines the highest peak, peak(k)=max {$\hat{W}(k)$} where $\hat{W}(k)$ is the channel weight vector provided by the adaptive filter operating in the first adaptation mode (Block 810). Next, the process 630 determines the next peak located outside the window around peak(k), next_peak=max {W(k)−R} where R is the region surrounding peak(i), the most recent located peak (Block 820). In one embodiment, R covers 25 samples on either of peak(i) for a total of 51 samples. Then, the process 630 determines if next_peak is greater than β*highest peak (Block 830). In one embodiment, β is equal to 0.6. If next_peak is not greater than β*highest peak, next_peak is assumed to be a false peak and is eliminated (Block 840). Otherwise, the process 630 determines the peak(i) to be next_peak (Block 850). Then, the process 630 determines if the number of peaks located so far is equal to L where L is the total number of peaks to be located (Block 860). In one embodiment, L is equal to 5. If not, the process 630 increments the peak index i=i+1 (Block 870), and then goes back to Block 820. Otherwise, the process 630 determines the leading edge of the impulse response from peak(i) where i=1, . . . , L (Block 880). The leading edge of the impulse response is located at the minimum peak in L peaks. This leading edge provides the estimated bulk delay. The process 630 is then terminated.

The echo cancellation using the AP update converges faster than the NLMS technique for colored inputs. The AP-based echo cancellation can be implemented in various ways. In one embodiment, the length M of the adaptive filter (i.e., the size of the channel weight vector) is the same in both the first and second adaptation modes. Three values of M are used for comparison: M=256, 512, and 1024. In another embodiment, the length M1 of the adaptive filter in the first adaptation mode is longer than the length M2 in the second adaptation mode. Typical values of M1 and M2 are 1024 and 256, respectively. There are also two ways to start the second adaptation mode. In the first way, the bulk delay is estimated during the first period of Rin. The bulk delay estimate is used to align an M=256-tap filter so that the echo channel impulse response falls within the shorter filter. The 256-tap filter is initialized at the estimate of the channel impulse response used to estimate the delay and the same Rin data are re-run. In the second way, the adaptation starts at the time when the delay estimate stopped. In other words, it follows the same procedure as in the first way, but does not restart the data stream.

The results of the AP(2) technique for echo cancellation are shown in Tables I and II, and FIGS. 9A, 9B, 10A, 10B, 11A, 11B, 12A, 12B, and 13. The standard AP(2) method was tested with data files used for G.168 test 2b (Rin and Sin).

Table I shows the attenuation in dB for the AP(2) and the NLMS techniques when Rin is non-zero. The AP(2) method uses the same filter length in both the first and second adaptation modes, M=256, 512, and 1024. It is seen that the AP(2) method has a performance improvement of approximately 10 dB at various stages of adaptation.

TABLE I

| Iteration Number | M = 256 | | M = 512 | | M = 1024 | |
| --- | --- | --- | --- | --- | --- | --- |
| | AP(2) | NLMS | AP(2) | NLMS | AP(2) | NLMS |
| 1000 | −33.49 | −26.31 | −24.31 | −22.58 | −18.44 | −18.4 |
| 1500 | −40.92 | −30.22 | −29.62 | −25.51 | −23.87 | −23.18 |
| 2000 | −44.86 | −36.61 | −35.40 | −29.23 | −25.52 | −23.86 |
| 4800 | −45.14 | −44.57 | −45.79 | −36.92 | −34.79 | −27.89 |
| 7600 | −45.65 | −47.07 | −47.13 | −42.47 | −41.06 | −31.04 |
| 10400 | −47.53 | −49.96 | −46.13 | −45.54 | −44.91 | −33.24 |
| 13200 | −46.0 | −49.06 | −46.67 | −47.80 | −46.07 | −35.38 |
| 16000 | −45.07 | −47.89 | −48.73 | −49.99 | −47.23 | −37.52 |
| 18800 | −47.49 | −48.75 | −46.10 | −48.67 | −45.75 | −38.57 |
| 21600 | −48.09 | −50.47 | −47.61 | −50.27 | −47.98 | −40.66 |
| 24400 | −45.80 | −48.22 | −46.63 | −48.7 | −47.47 | −41.78 |

Table II shows the attenuation in dB for the AP(2) in the first and second ways of the second adaptation mode. The time required for the delay estimate in the first way is added to the iteration number for an accurate comparison. The estimate occurs at about 1500 iterations and uses 1500 samples of Rin. This corresponds to 500 iterations of the AP(2) technique when the filter is filled with data. Therefore, the correction is bounded by 500 and 1500 iterations. However, the upper bound iteration numbers fall in the dead zone for Rin for which there are no cancellation performance results. The lower bound yields a significant advantage for the first way. The convergence occurs somewhere between 2500 and 3500 iterations for the first way, and somewhat less than 4800 iterations for the second way.

TABLE II

| Iteration | First Way | Second Way |
| --- | --- | --- |
| 1000 | −38.48 | −18.44 |
| 1250 | −41.91 | −23.01 |
| 1500 | −43.03 | −23.87 |
| 1750 | −47.05 | −29.24 |
| 2000 | −45.99 | −33.9 |
| 3800 | — | −37.53 |
| 4300 | — | −42.77 |
| 4800 | — | −44.89 |

Figure 9A:
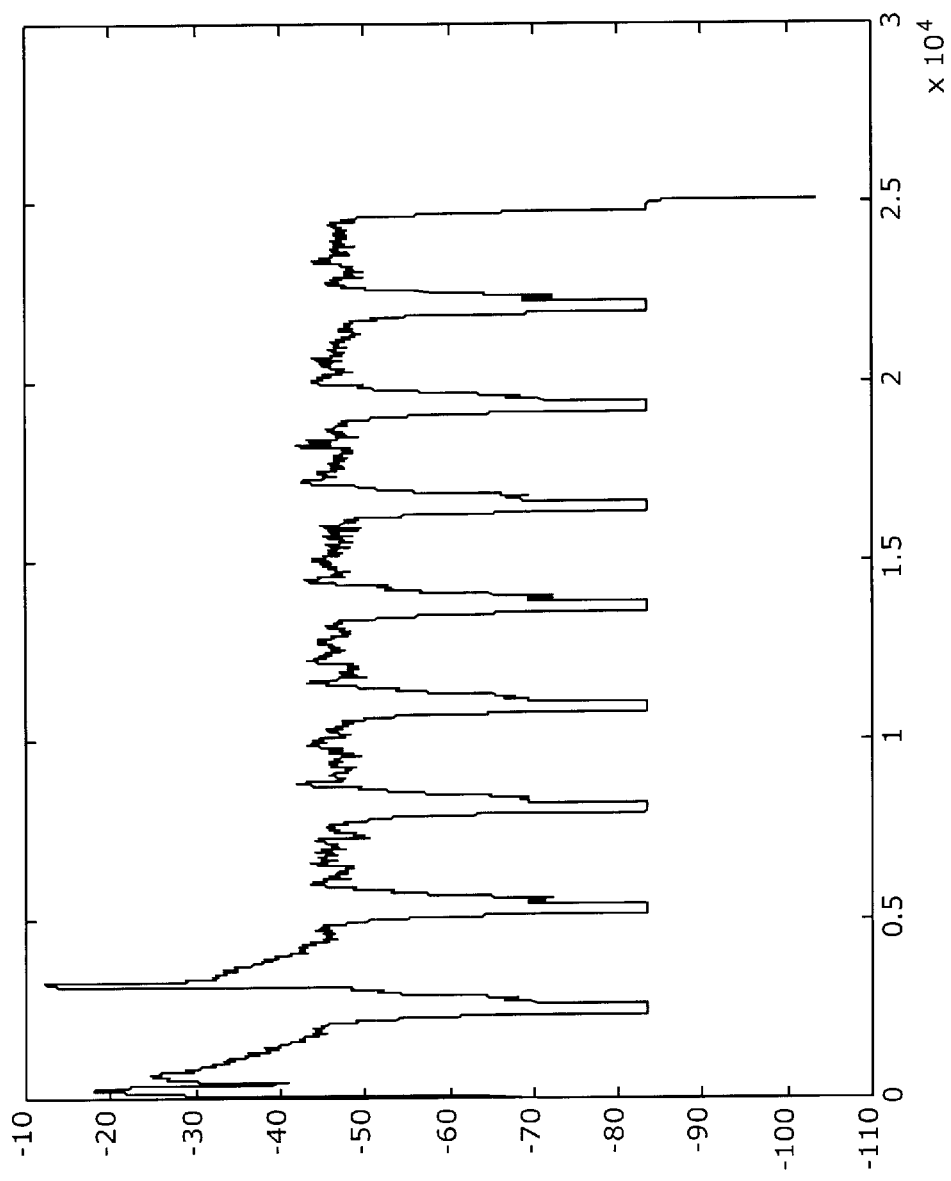
FIG. 9A is a diagram illustrating attenuation in dB for the echo canceller using AP(2) with M=256 according to one embodiment of the invention.

FIG. 9A is a diagram illustrating attenuation in dB for the echo canceller using AP(2) with M=256 according to one embodiment of the invention.

Figure 9B:
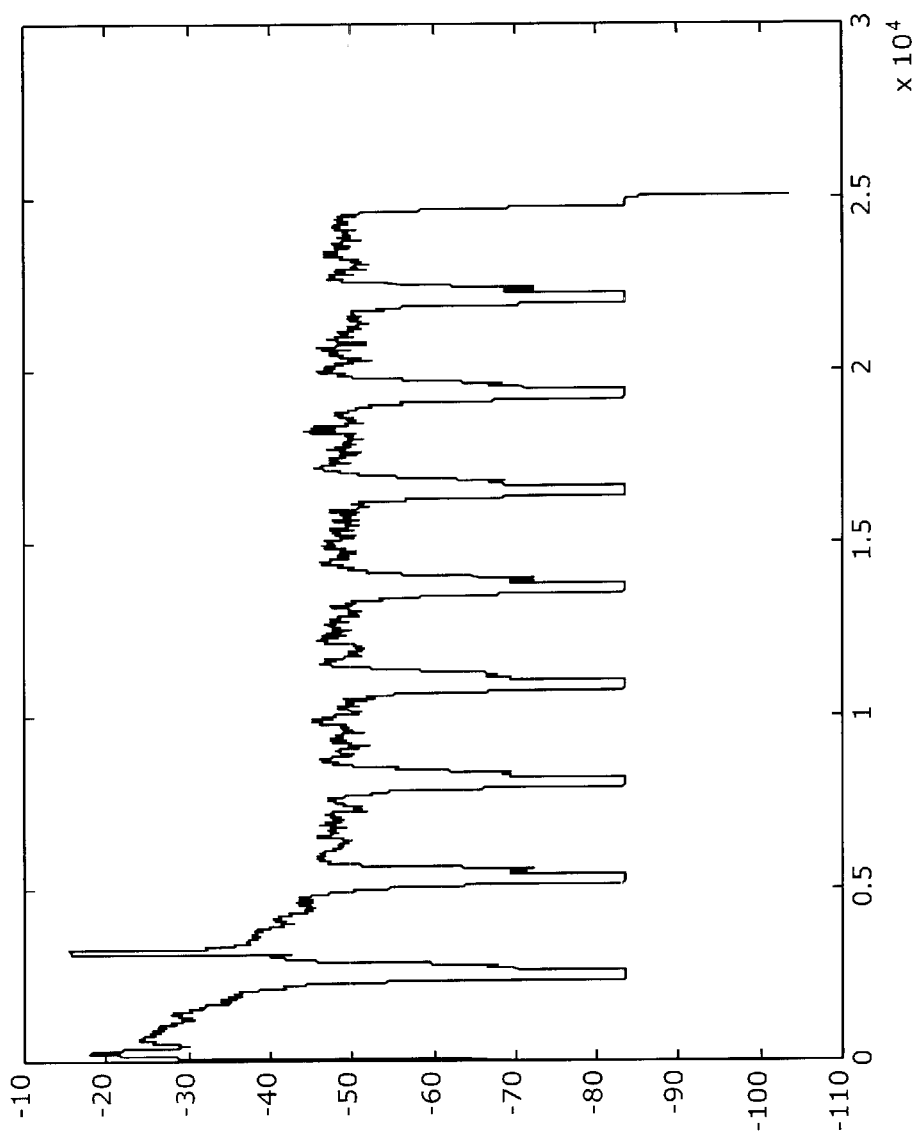
FIG. 9B is a diagram illustrating attenuation in dB for the echo canceller using NLMS with M=256 according to one embodiment of the invention.

FIG. 9B is a diagram illustrating attenuation in dB for the echo canceller using NLMS with M=256 according to one embodiment of the invention.

Figure 10A:
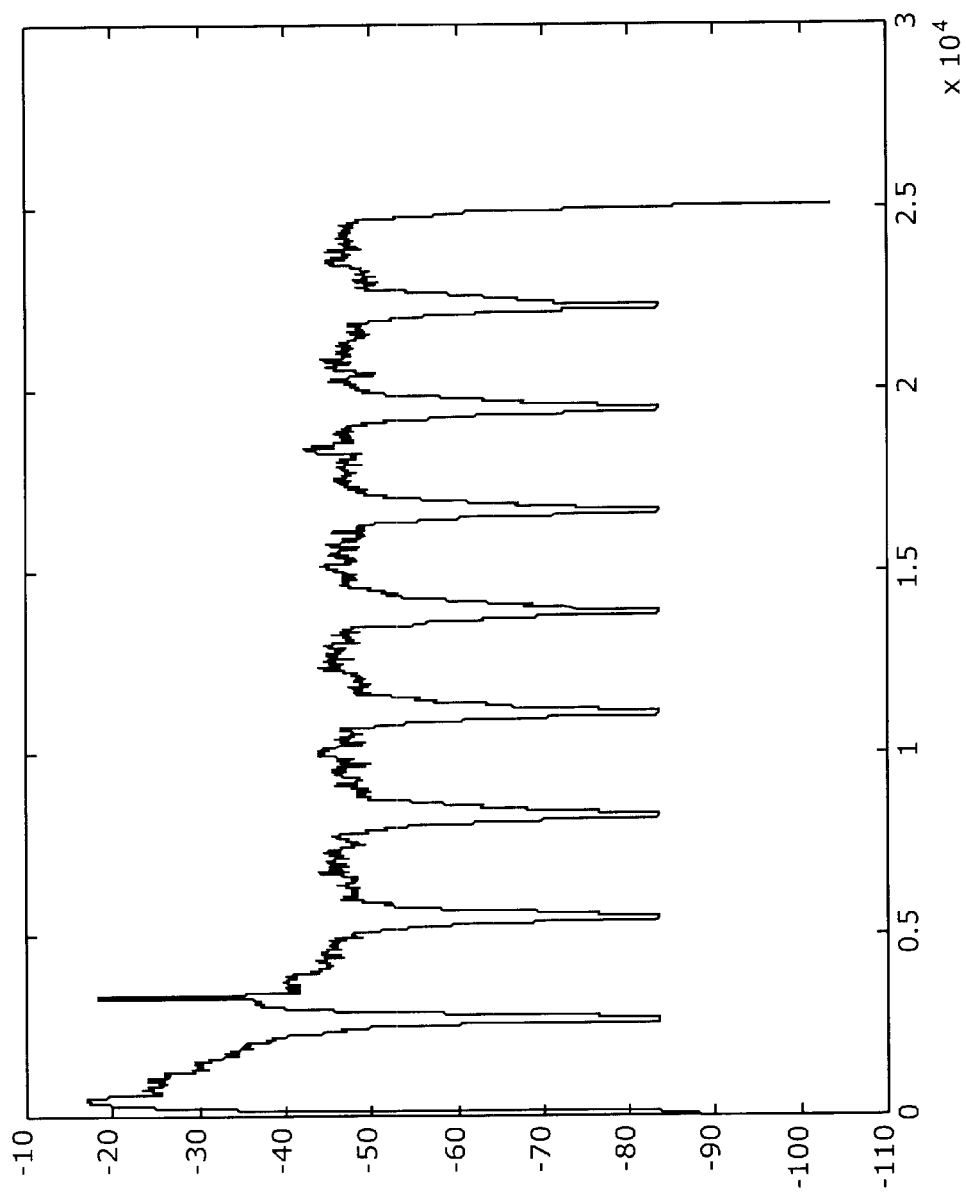
FIG. 10A is a diagram illustrating attenuation in dB for the echo canceller using AP(2) with M=512 according to one embodiment of the invention.

FIG. 10A is a diagram illustrating attenuation in dB for the echo canceller using AP(2) with M=512 according to one embodiment of the invention.

Figure 10B:
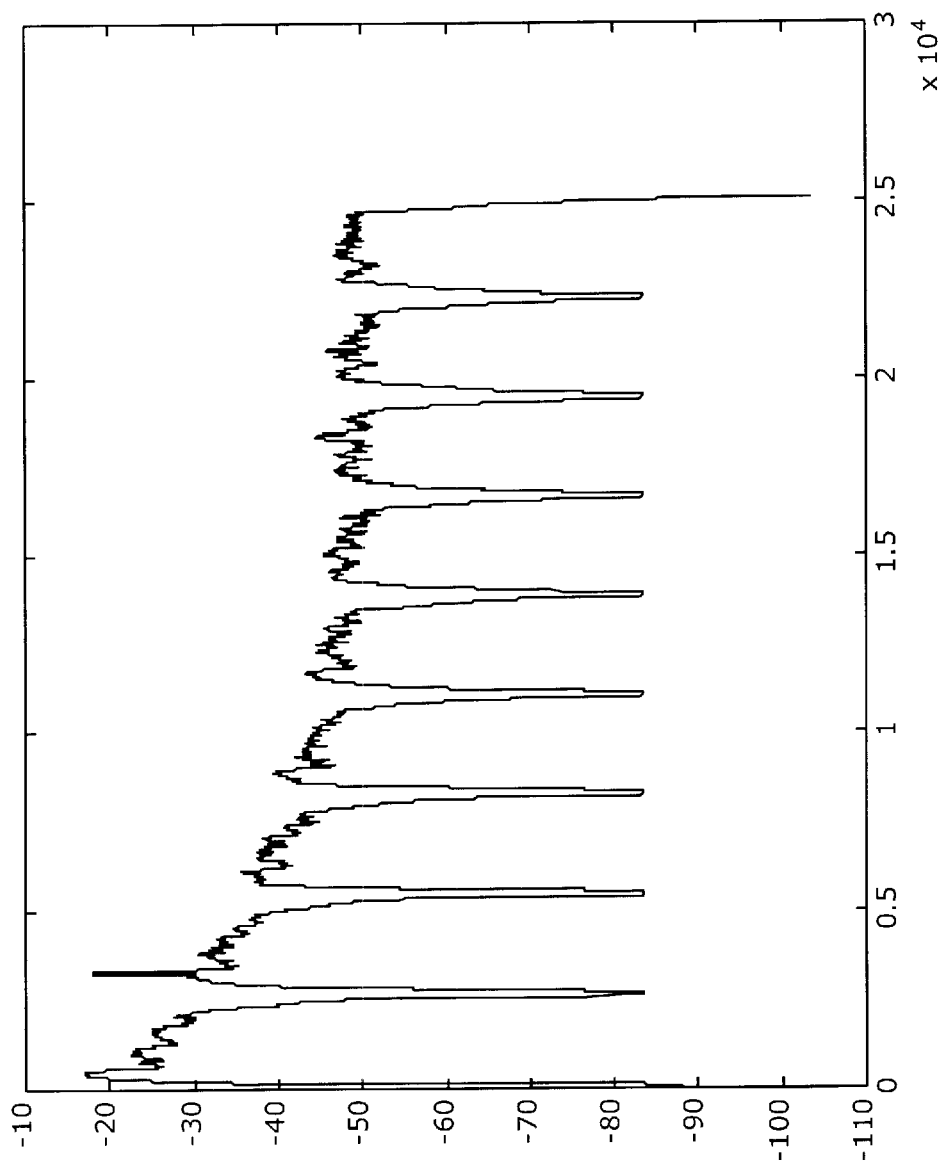
FIG. 10B is a diagram illustrating attenuation in dB for the echo canceller using NLMS with M=512 according to one embodiment of the invention.

FIG. 10B is a diagram illustrating attenuation in dB for the echo canceller using NLMS with M=512 according to one embodiment of the invention.

Figure 11A:
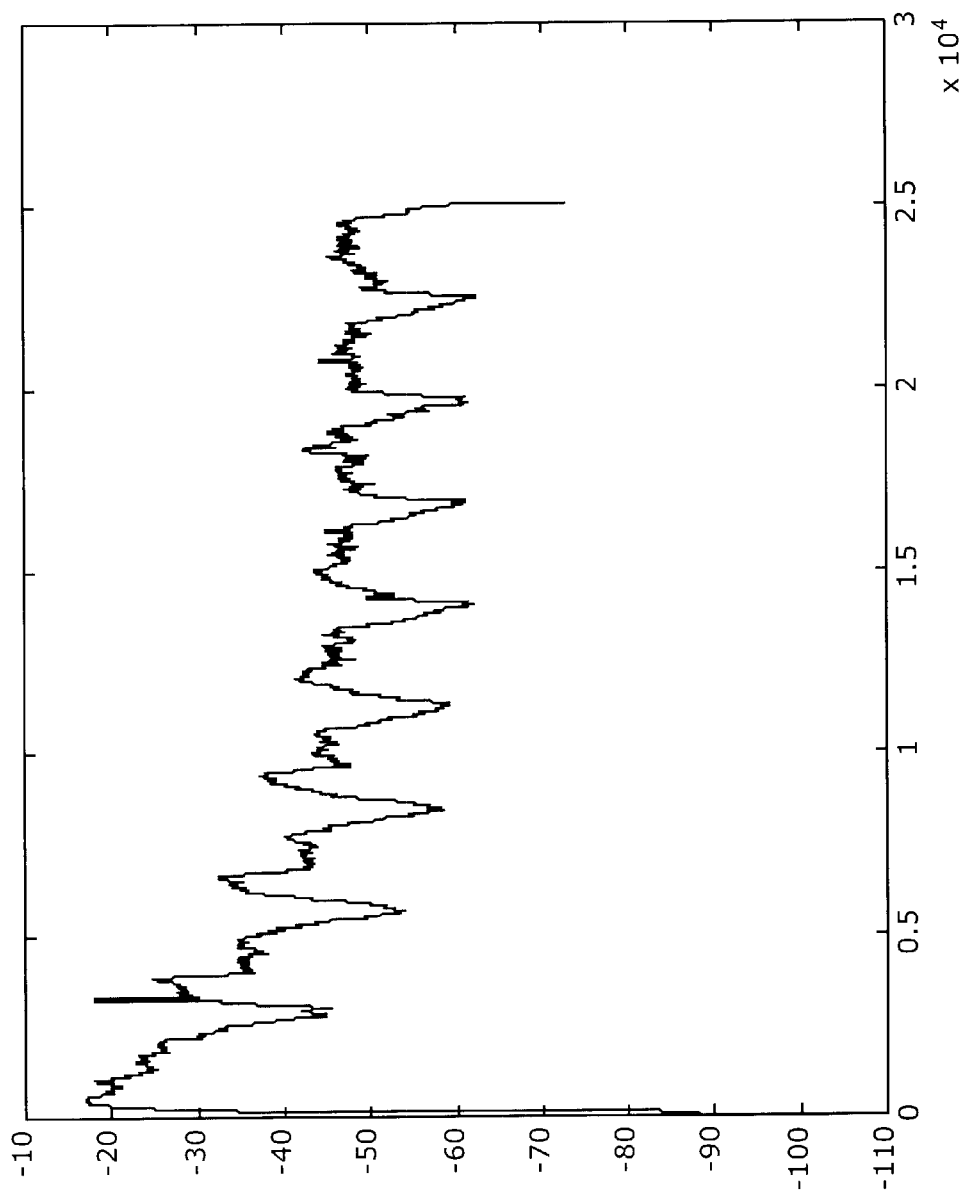
FIG. 11A is a diagram illustrating attenuation in dB for the echo canceller using AP(2) with M=1024 according to one embodiment of the invention.

FIG. 11A is a diagram illustrating attenuation in dB for the echo canceller using AP(2) with M=1024 according to one embodiment of the invention.

FIG. 11B is a diagram illustrating attenuation in dB for the echo canceller using NLMS with M=1024 according to one embodiment of the invention.

Figure 12A:
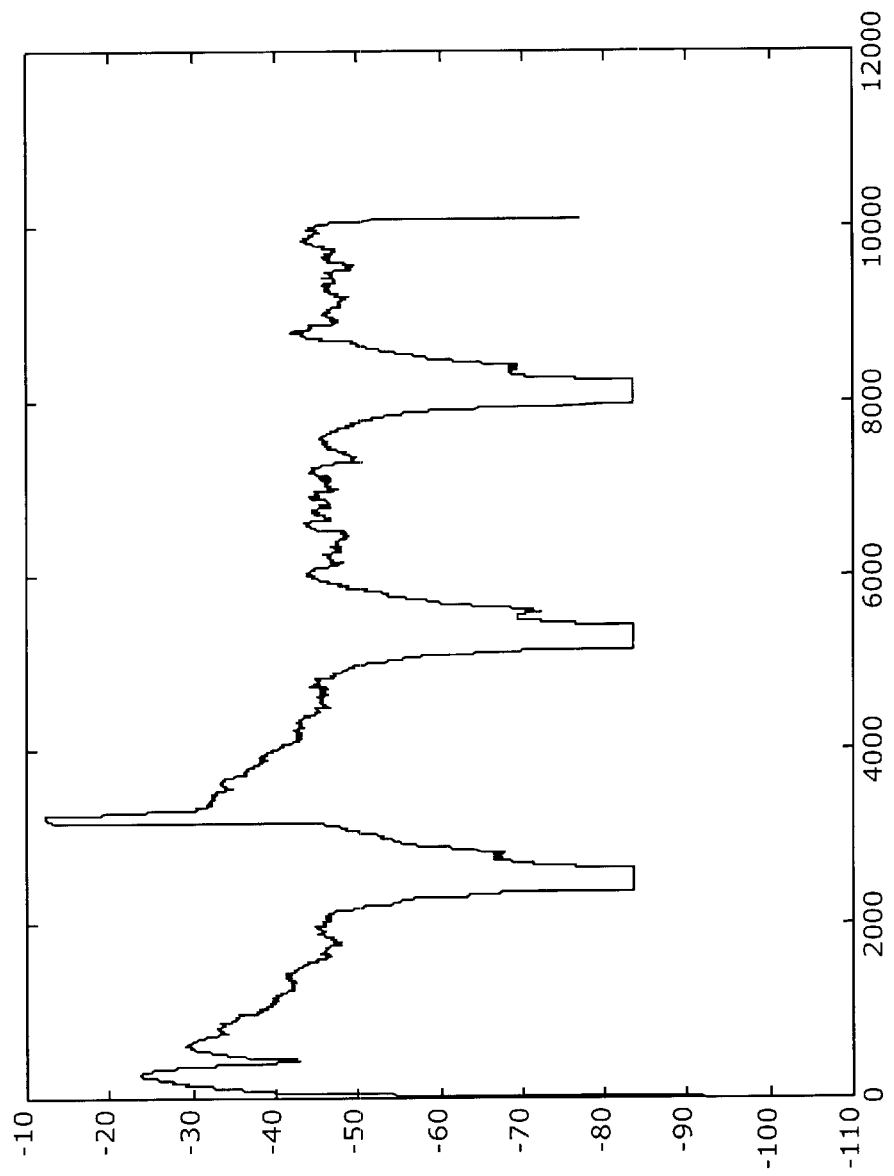
FIG. 12A is a diagram illustrating attenuation in dB for the echo canceller operating in the second adaptation mode using the first way of AP(2) with M1=1024 and M2=256 according to one embodiment of the invention.

FIG. 12A is a diagram illustrating attenuation in dB for the echo canceller operating in the second adaptation mode using the first way of AP(2) with M1=1024 and M2=256 according to one embodiment of the invention.

Figure 12B:
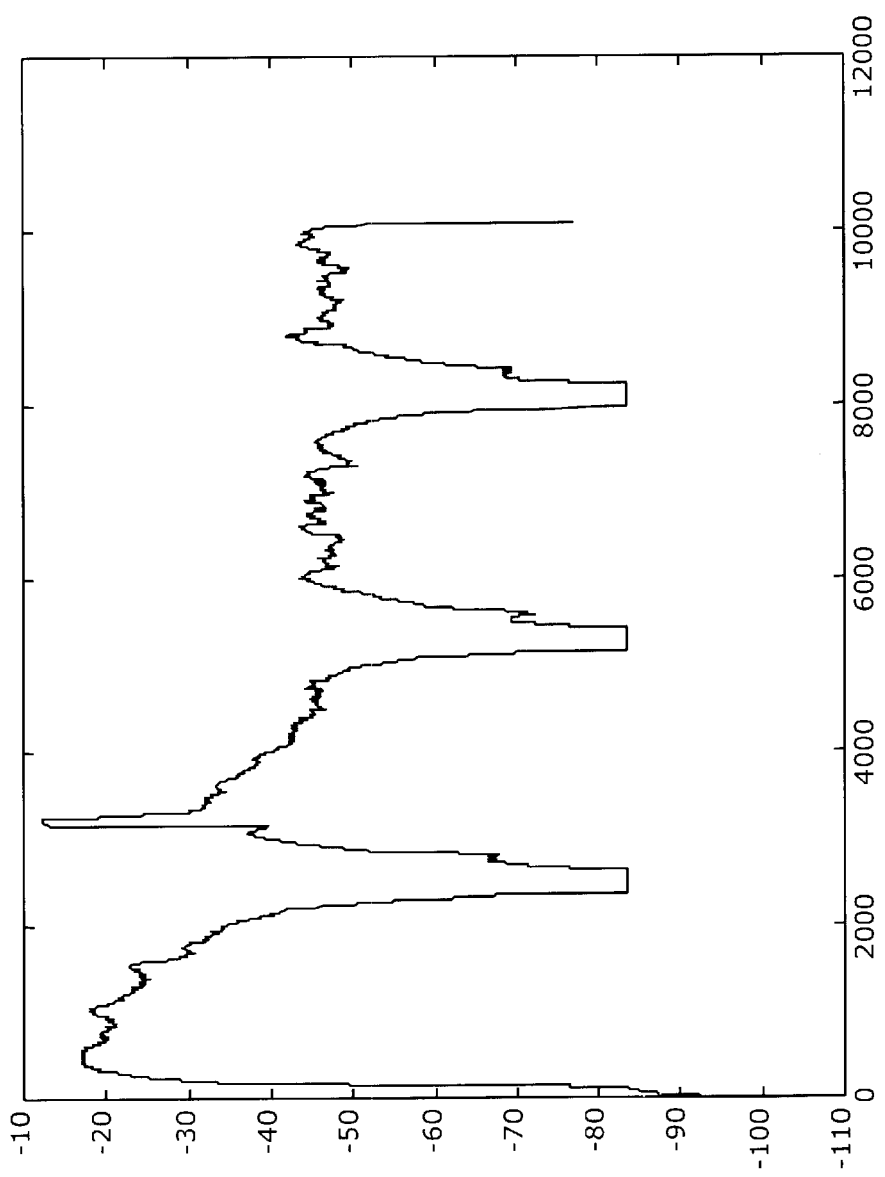
FIG. 12B is a diagram illustrating attenuation in dB for the echo canceller operating in the second adaptation mode using the second way of AP(2) with M1=1024 and M2=256 according to one embodiment of the invention.

FIG. 12B is a diagram illustrating attenuation in dB for the echo canceller operating in the second adaptation mode using the second way of AP(2) with M1=1024 and M2=256 according to one embodiment of the invention.

Figure 13:
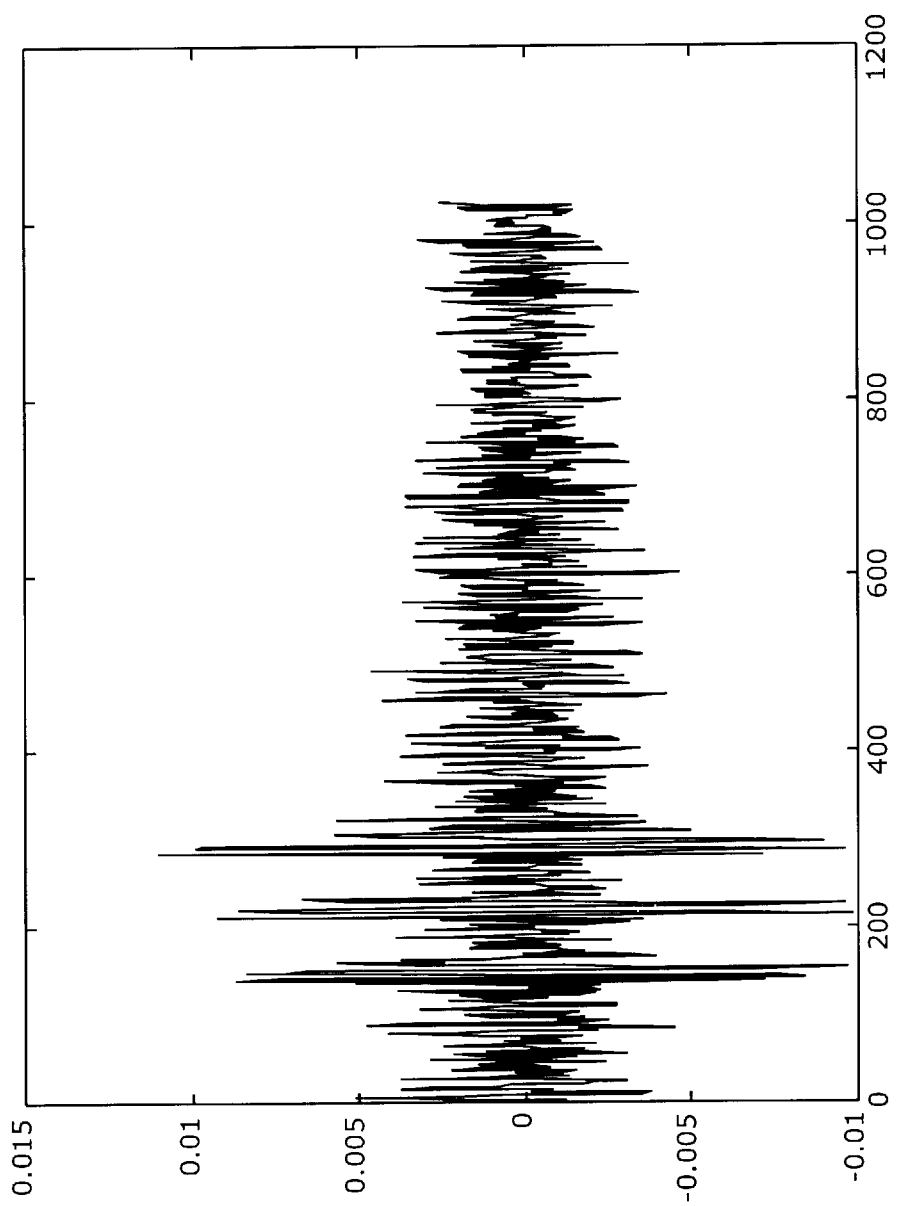
FIG. 13 is a diagram illustrating the weights at M+500 iterations according to one embodiment of the invention.

FIG. 13 is a diagram illustrating the weights at M+500 iterations according to one embodiment of the invention. The three peaks of the echo channel impulse response are clearly seen.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:

an adaptive filter to estimate a channel weight vector of an echo channel using an affine projection (AP) update, the echo channel receiving a send input sequence and a receive input sequence, the channel weight vector having first and second lengths when the adaptive filter operates in a delay mode and an adaptation mode, respectively; and a delay estimator coupled to the adaptive filter to determine a delay in the echo channel using the adaptive filter in the delay mode;

wherein the receive input sequence is represented by a sum of a random sequence and a past receive input sequence weighted by a receive weight vector.

2. The apparatus of claim 1, wherein the adaptive filter operates in the adaptation mode based on the delay determined by the delay estimator.

3. The apparatus of claim 1, wherein the first length is longer than the second length.

4. The apparatus of claim 1 wherein the adaptive filter comprises:

a receive weight estimator to estimate the receive weight vector at a first update rate using the past receive input sequence and the receive input sequence;

a random estimator coupled to the receive weight estimator to estimate the random sequence at a second update rate using the estimated receive weight vector;

an error estimator to estimate an error at the second update rate using the send input sequence, the receive input sequence, and the estimated channel weight vector; and a weight updater coupled to the error estimator and the random estimator to update the channel weight vector at the second update rate using the estimated error and the estimated random sequence.

5. The apparatus of claim 4 wherein the adaptive filter, when operating in the adaptation mode, initializes the channel weight vector by the estimated channel weight vector updated in the delay mode.

6. The apparatus of claim 4 wherein the first update rate is slower than the second update rate.

7. The apparatus of claim 4 wherein the weight updater freezes the channel weight vector when a short-term average power is less than a long-term average power by a threshold power amount.

8. The apparatus of claim 1 wherein the delay estimator comprises:
a peak locator to locate L peaks of an impulse response of the echo channel using the channel weight vector, the L peaks being located within a predetermined distance from one another.

9. The apparatus of claim 8 wherein the delay estimator further comprises:
a peak eliminator to eliminate a false peak in the L peaks; and
a leading edge locator to locate a leading edge of the impulse response, the leading edge being a shortest peak in the L peaks and within a predetermined distance from the delay.

10. A method comprising:
estimating a channel weight vector of an echo channel by an adaptive filter using an affine projection (AP) update, the echo channel receiving a send input sequence and a receive input sequence, the channel weight vector having first and second lengths when the adaptive filter operates in a delay mode and an adaptation mode, respectively; and
determining a delay in the echo channel by a delay estimator using the adaptive filter in the delay mode;
wherein the receive input sequence is represented by a sum of a random sequence and a past receive input sequence weighted by a receive weight vector.

11. The method of claim 10 wherein estimating the channel weight vector comprises operating in the adaptation mode based on the delay determined by the delay estimator.

12. The method of claim 10 wherein the first length is longer than the second length.

13. The method of claim 10 wherein estimating the channel weight vector comprises:
estimating the receive weight vector at a first update rate using the past receive input sequence and the receive input sequence;
estimating the random sequence at a second update rate using the estimated receive weight vector;
estimating an error at the second update rate using the send input sequence, the receive input sequence, and the estimated channel weight vector; and
updating the channel weight vector at the second update rate using the estimated error and the estimated random sequence.

14. The method of claim 13 wherein operating in the adaptation mode comprises initializing the channel weight vector by the estimated channel weight vector updated in the delay mode.

15. The method of claim 13 wherein the first update rate is slower than the second update rate.

16. The method of claim 13 wherein updating the channel weight vector comprises freezing the channel weight vector when a short-term average power is less than a long-term average power by a threshold power amount.

17. The method of claim 10 wherein determining the delay comprises:
locating L peaks of an impulse response of the echo channel using the channel weight vector by a peak locator, the L peaks being located within a predetermined distance from one another.

18. The method of claim 17 wherein determining the delay further comprises:
eliminating a false peak in the L peaks; and
locating a leading edge of the impulse response, the leading edge being a shortest peak in the L peaks and within a predetermined distance from the delay.

19. A system comprising:
a first decoder coupled to a far end of an acoustic channel to decode a far end signal, the first decoder generating a receive input sequence;
a second decoder coupled to a near end of the acoustic channel to decode a near end signal, the second decoder generating a send input sequence; and
an echo canceller in an echo channel coupled to the first and second decoders to perform echo cancellation, the echo channel receiving the receive and send input sequences, the echo canceller comprising:
an adaptive filter to estimate a channel weight vector of the echo channel using an affine projection (AP) update, the channel weight vector having first and second lengths when the adaptive filter operates in a delay mode and an adaptation mode, respectively, and
a delay estimator coupled to the adaptive filter to determine a delay in the echo channel using the adaptive filter in the delay mode;
wherein the receive input sequence is represented by a sum of a random sequence and a past receive input sequence weighted by a receive weight vector.

20. The system of claim 19 wherein the adaptive filter operates in the adaptation mode based on the delay determined by the delay estimator.

21. The system of claim 19 wherein the first length is longer than the second length.

22. The system of claim 19 wherein the adaptive filter comprises:
a receive weight estimator to estimate the receive weight vector at a first update rate using the past receive input sequence and the receive input sequence;
a random estimator coupled to the receive weight estimator to estimate the random sequence at a second update rate using the estimated receive weight vector;
an error estimator to estimate an error at the second update rate using the send input sequence, the receive input sequence, and the estimated channel weight vector; and
a weight updater coupled to the error estimator and the random estimator to update the channel weight vector at the second update rate using the estimated error and the estimated random sequence.

23. The system of claim 22 wherein the adaptive filter, when operating in the adaptation mode, initializes the channel weight vector by the estimated channel weight vector updated in the delay mode.

24. The system of claim 22 wherein the first update rate is slower than the second update rate.

25. The system of claim 22 wherein the weight updater freezes the channel weight vector when a short-term average power is less than a long-term average power by a threshold power amount.

26. The system of claim 19 wherein the delay estimator comprises:
a peak locator to locate L peaks of an impulse response of the echo channel using the channel weight vector, the L peaks being located within a predetermined distance from one another.

27. The system of claim 26 wherein the delay estimator further comprises:
a peak eliminator to eliminate a false peak in the L peaks; and
a leading edge locator to locate a leading edge of the impulse response, the leading edge being a shortest peak in the L peaks and within a predetermined distance from the delay.

28. A computer program product comprising:
a machine useable medium having program code embedded therein, the program code comprising:
computer readable program code to estimate a channel weight vector of an echo channel by an adaptive filter using an affine projection (AP) update, the echo channel receiving a send input sequence and a receive input sequence, the channel weight vector having first and second lengths when the adaptive filter operates in a delay mode and an adaptation mode, respectively; and
computer readable program code to determine a delay in the echo channel by a delay estimator using the adaptive filter in the delay mode;
wherein the receive input sequence is represented by a sum of a random sequence and a past receive input sequence weighted by a receive weight vector.

29. The computer program product of claim 28 wherein the computer readable program code to estimate the channel weight vector comprises computer readable program code to operate in the adaptation mode based on the delay determined by the delay estimator.

30. The computer program product of claim 28 wherein the first length is longer than the second length.

31. The computer program product of claim 28 wherein the computer readable program code to estimate the channel weight vector comprises:
computer readable program code to estimate the receive weight vector at a first update rate using the past receive input sequence and the receive input sequence;
computer readable program code to estimate the random sequence at a second update rate using the estimated receive weight vector;
computer readable program code to estimate an error at the second update rate using the send input sequence, the receive input sequence, and the estimated channel weight vector; and
computer readable program code to update the channel weight vector at the second update rate using the estimated error and the estimated random sequence.

32. The computer program product of claim 31 wherein the computer readable program code to operate in the adaptation mode comprises computer readable program code to initialize the channel weight vector by the estimated channel weight vector updated in the delay mode.

33. The computer program product of claim 31 wherein the first update rate is slower than the second update rate.

34. The computer program product of claim 31 wherein the computer readable program code to update comprises computer readable program code to freeze the channel weight vector when a short-term average power is less than a long-term average power by a threshold power amount.

35. The computer program product of claim 28 wherein the computer readable program code to determine the delay comprises:
computer readable program code to locate L peaks of an impulse response of the echo channel using the channel weight vector by a peak locator, the L peaks being located within a predetermined distance from one another.

36. The computer program product of claim 35 wherein the computer readable program code to determine the delay further comprises:
computer readable program code to eliminate a false peak in the L peaks; and
computer readable program code to locate a leading edge of the impulse response, the leading edge being a shortest peak in the L peaks and within a predetermined distance from the delay.

* * * * *